United States Patent
Rink

(10) Patent No.: US 8,890,383 B2
(45) Date of Patent: Nov. 18, 2014

(54) BEARING HAVING A POWER GENERATION UNIT

(75) Inventor: Thomas Rink, Waldfenster (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 257 days.

(21) Appl. No.: 13/382,017

(22) PCT Filed: Jul. 1, 2010

(86) PCT No.: PCT/DE2010/000773
§ 371 (c)(1), (2), (4) Date: Mar. 20, 2012

(87) PCT Pub. No.: WO2011/000365
PCT Pub. Date: Jan. 6, 2011

(65) Prior Publication Data
US 2012/0175983 A1 Jul. 12, 2012

(30) Foreign Application Priority Data
Jul. 3, 2009 (DE) .......................... 10 2009 031 609

(51) Int. Cl.
*H02K 7/09* (2006.01)
*F16C 41/00* (2006.01)
*H02K 7/18* (2006.01)

(52) U.S. Cl.
CPC ................ *F16C 41/004* (2013.01); *H02K 7/09* (2013.01); *H02K 7/1846* (2013.01)
USPC ............. 310/90.5; 310/90; 384/446; 384/448

(58) Field of Classification Search
CPC ................................. H02K 29/12; H02K 7/09
USPC ............. 310/90, 90.5; 384/446, 448; 324/174
See application file for complete search history.

(56) References Cited

U.S. PATENT DOCUMENTS

| | | |
|---|---|---|
| 5,204,653 A | 4/1993 | Saitoh et al. |
| 5,385,410 A | 1/1995 | Shirai et al. |

(Continued)

FOREIGN PATENT DOCUMENTS

| | | | |
|---|---|---|---|
| JP | 1 284573 A | | 11/1989 |
| JP | 2003269477 A | * | 9/2003 |
| JP | 2006090501 A | | 4/2006 |

OTHER PUBLICATIONS

JP 01284573 A to Ozaki, Ryuich (Nov. 1989) English Translation.*

(Continued)

*Primary Examiner* — Quyen Leung
*Assistant Examiner* — Robert E Mates
(74) *Attorney, Agent, or Firm* — Simpson & Simpson, PLLC

(57) ABSTRACT

A bearing, which has a first bearing ring, a second bearing ring, a rolling element interposed between the two bearing rings and a claw pole generator-type power generation unit. The bearing has a substantially space-neutral power generation unit which has a high filling factor for the induction coil. The first claw of the claw ring is connected to a magnetically conducting section of the body of the first bearing ring in a magnetically conducting fashion. The magnetic poles of the pole pairs are mounted so as to be connected to a magnetically conducting section of the body of the second bearing ring in a magnetically conducting fashion and the magnetic circuit is substantially closed via the two magnetic sections and the rolling element.

10 Claims, 2 Drawing Sheets

(56) References Cited

U.S. PATENT DOCUMENTS

| | | |
|---|---|---|
| 5,850,141 A | 12/1998 | Adler |
| 6,838,794 B2 | 1/2005 | Iwamoto et al. |
| 2005/0174011 A1 | 8/2005 | Mizutani et al. |
| 2009/0102314 A1* | 4/2009 | Miyata et al. .............. 310/257 |

OTHER PUBLICATIONS

JP 2003269477 A to Okada et al. (Sep. 2003) English Translation.*

* cited by examiner

US 8,890,383 B2

BEARING HAVING A POWER GENERATION UNIT

CROSS-REFERENCE TO RELATED APPLICATIONS

This application is a 371 of PCT/DE2010/000773 filed Jul. 1, 2010, which in turn claims the priority of DE 10 2009 031 609.4 filed Jul. 3, 2009. The priority of both applications is hereby claimed and both applications are incorporated by reference herein.

BACKGROUND OF THE INVENTION

The invention relates to a bearing, which has a power generation unit.

The prior art discloses bearings which comprise a power generation unit in the form of a claw pole generator. The claw pole generator comprises an induction coil with an electrical conductor which is wound with a plurality of turns. In order to supply a voltage which is sufficient even at low rotation speeds, the induction coil should have a high fill factor, i.e. the electrical conductor should have as high a number of turns as possible.

U.S. Pat. No. 6,838,794 B2 describes a roller bearing, which comprises a first bearing ring, a second bearing ring, a plurality of rolling bodies arranged between the two bearing rings, and a power generation unit, which is in the form of a claw pole generator. In addition, the roller bearing also comprises a first claw ring that is fastened to the first bearing ring and has a sequence of first claws that run peripherally along a circumference of the first bearing ring, a second claw ring that is fastened to the first bearing ring arid has a sequence of second claws that run peripherally along the circumference of the first bearing ring, and a magnetic induction coil which is arranged between the two claw rings. The bearing further comprises a sequence of magnetic poles in the form of a magnet ring that run peripherally along a circumference of the second bearing ring, a magnetic induction coil, which is arranged between the two claw rings, and a closed magnetic circuit, which runs peripherally around the induction coil to the second magnetic pole of the magnet ring that does not have the same name as the first magnetic pole, that is closed by a first magnetic pole of the magnet ring via a first claw of the first claw ring and via a second claw of the second claw ring. If the two bearing rings rotate relative to one another, the magnetic flux in the magnetic circuit changes, since each claw is guided past a different pole. The change over time in the magnetic flux induces an AC voltage in the induction coil with a magnitude which is dependent on the number of turns in the induction coil. In order to achieve as high an induced voltage as possible, in particular a large number of turns need to be provided for the induction coil. The induction coil is arranged in a receptacle in the form of a U in cross-section. The limbs of the U are formed by the two claw rings, and the two claw rings are magnetically conductively connected to one another by the base of the U, with the result that the magnetic flux is guided through the first claw in the first limb of the U, then through the base of the U and then through a second claw in the second limb of the U. The base of the U bears against the first bearing ring and reduces u t of physical space between the two bearing rings which is available for receiving as high a number of turns of the induction coil as possible. One measure which is proposed for increasing the number of turns of the induction coil is that of providing in each case one recess in the two opposing bearing rings and arranging the induction coil and the sequence of magnetic poles in the respective recess, with the result that the induction coil can take up an increased amount of space. For this purpose, structural changes to the two lateral surfaces of the two bearing rings are required.

US 2005/0174011 A1 describes a roller bearing, which has a claw pole generator. The sequence of magnetic poles in the form of a peripherally running magnet ring is arranged in a recess in the second bearing ring, and a section of the induction coil, surrounded in cross-section on all sides by the sheet-metal cuts of the two claw rings, rests on an end face of the first bearing ring or a section of said induction coil is arranged in a recess arranged in the lateral surface of the first bearing ring.

JP 2006090501 AA (Abstract) describes a bearing in the form of a roller bearing with a first bearing ring, a second bearing ring, a plurality of rolling bodies arranged between the two bearing rings, a power generation unit in the form of a claw pole generator and an induction coil surrounded by a variable magnetic flux. Magnetically conductive claws of a claw ring are arranged along the circumference, spaced apart from the first bearing ring. A sequence of magnetized and non-magnetized sections of a magnet ring, which sequence runs peripherally along the circumference, is arranged on the first bearing ring. The induction coil is arranged with a first section on an end face of the second bearing ring and with a second section at a recess in the lateral surface of the second bearing ring. Depending on whether a magnetized or a non-magnetized section is opposite the claw, a voltage signal is generated in the induction coil. The magnet ring with the magnetic poles is arranged outside the bearing. The induction coil protrudes beyond the end faces of both bearing rings, with the result that a considerable amount of space is required.

SUMMARY OF THE INVENTION

Broadly, the invention relates to a bearing, which has a first bearing ring, a second bearing ring, a rolling body arranged between the two bearing rings, and a power generation unit. The power generation unit comprises a sequence of magnetic pole pairs that run peripherally along a circumference of the second bearing ring, a claw ring, which is fastened to the first bearing ring and has a sequence of claws that run peripherally along a circumference of the first bearing ring, and a magnetic induction coil, which has a closed magnetic circuit that runs peripherally around the induction coil and is closed by a first magnetic pole of the first pole pair via a first claw of the claw ring.

The object of the invention is to specify a bearing with a power generation unit which is substantially neutral in terms of installation space and has a high fill factor for the induction coil.

This object is achieved according to the invention for the bearing by virtue of the fact that the first claw of the claw ring is arranged in a magnetically conductive connection with a magnetically conductive section of the body of the first bearing ring, that the magnetic poles are arranged in a magnetically conductive connection with a magnetically conductive section of the body of the second bearing ring, and that the magnetic circuit is closed substantially via the two magnetic sections and the rolling body.

The closing of the magnetic circuit via the magnetically conductive sections of the two bearing rings and via the at least one rolling body of the roller bearing makes it possible to provide only one claw ring, via which the magnetic field is introduced into the first bearing ring. A second claw ring is thus superfluous, with the result that additional installation space is available in the axial direction, i.e. along an axis of rotation of the roller bearing, or in the radial direction, i.e. perpendicular to the axis of rotation of the roller bearing, with it being possible for this additional installation space to be used for the induction coil, with the result that the wound electrical conductor of the induction coil has a high number of turns. Substantially the entire installation space between the rolling body and the end faces of the two bearing rings in the axial direction and between the two bearing rings in the radial direction is available for the induction coil.

If a basic body of one of the two bearing rings is formed from a material with no or only poor magnetic conductivity, such as plastic or ceramic, the respective magnetically conductive section is formed, for example, by a coating applied to the basic body or by a sleeve fitted on the basic body consisting of a magnetically conductive material, the claw ring or the magnetic poles then being brought into magnetically conductive connection with the coating or the sleeve.

Provision is made for the induction coil and the magnetic poles to be combined to form a common structural unit, which is fastened on the second bearing ring. In this case, the induction coil is received in an electrically insulated receptacle consisting of plastic, for example. The magnetic poles can likewise be received in the plastic and can be arranged at a rim of the plastic so as to form the magnetically conductive connection to the second bearing ring, with the result that, when the structural unit is fitted, the magnets make direct magnetically conductive contact with a lateral surface of the second bearing ring. In the process, the plastic keeps the magnetic poles physically separated and magnetically isolated from one another.

Provision is made for the claw ring to have a body in the form of a circular ring with a radial slit. The radial slit in the claw ring suppresses eddy currents between adjacent claws in the circumferential direction of the claw ring and increases the effectiveness of the magnetic flux guidance through the claws which are adjacent to the slit. The slit further makes it possible to press together and spread apart the claw ring slightly and to insert it between the two bearing rings, with the result that the claw ring bears, under mechanical prestress, against the bearing ring and in particular a large interface with respect to the bearing ring is formed, which simplifies guidance of the magnetic flux out of or into that section of the body of the first bearing ring which closes the magnetic circuit.

Provision is made for a magnetically conductive contact element to be provided. The magnetically conductive contact element improves the guidance of the magnetic flux at the interfaces forming between the magnetic poles and the body of the second bearing ring and between the first claw and the body of the first bearing ring. The magnetically conductive contact element can comprise a liquid or paste-like adhesive. In particular, the magnetically conductive contact element can comprise an adhesive containing iron or ferrite particles.

Further advantages and features of the invention are given in the dependent claims and in the description of a preferred exemplary embodiment of the invention.

The invention will be described and explained in more detail below with reference to the attached drawings using a preferred exemplary embodiment.

DETAILED DESCRIPTION OF THE INVENTION

Figure 1:
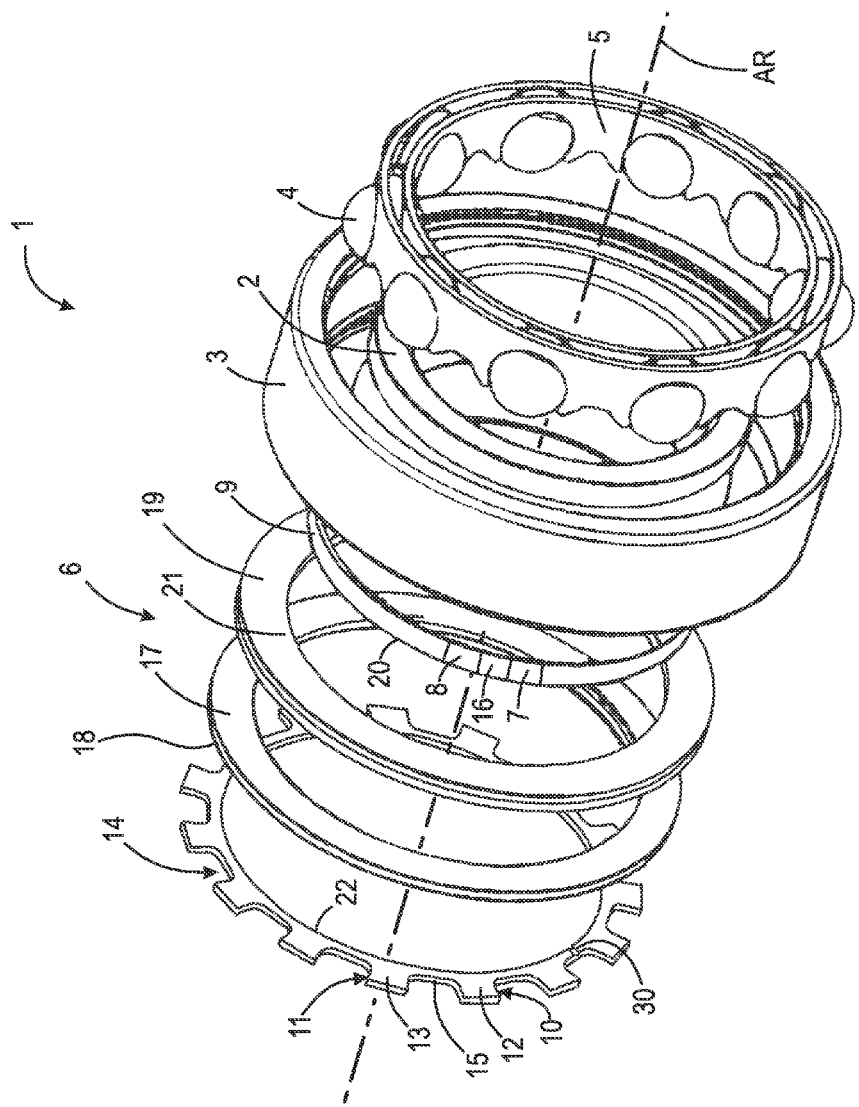
FIG. 1 shows an exploded illustration of an exemplary embodiment of a bearing according to the invention.

FIG. 1 shows a bearing 1 in the form of a roller bearing, which comprises a first bearing ring 2 in the form of an inner ring of the bearing 1 and a second bearing ring 3 in the form of an outer ring of the bearing 1. The first bearing ring 2 receives a shaft (riot illustrated in the figure) and bears this shaft rotatably with respect to a bearing receptacle (not illustrated in the figure), on which the second bearing ring 3 is arranged fixedly. The bearing 1 further comprises rolling bodies 4, which are arranged in a cage 5 between the two bearing rings 2, 3 and make it possible for the first bearing ring 2 to rotate relative to the second bearing ring 3.

The bearing 1 further comprises a power generation unit 6 in the form of a claw pole generator.

The power generation unit 6 comprises a sequence of magnetic poles running peripherally along a circumference of the second bearing ring 3, with two poles of a first pole pair 7 and a second pole pair 8 being shown, said poles have different names and being adjacent to one another in the circumferential direction. The poles are magnetic poles of individual magnets, specifically radially directed bar magnets, which are combined in a magnet ring 9, which is fastened on the second bearing ring 3. A magnetically nonconductive section 16 is formed between the pole pairs 7, 8, adjacent in the circumferential direction, of the individual magnets.

The power generation unit 6 further comprises a claw ring fastened to the first bearing ring 2 and a sequence of claws running peripherally along a circumference of the first bearing ring 2. Two claws adjacent in the circumferential direction are indicated by the reference symbols 10, 11. The claws 10, 11 of the claw ring comprise a radially directed, magnetically conductive section 12, 13. All of the claws of the claw ring are formed on a ring-shaped body 14 of the claw ring, with the result that in each case adjacent claws 10, 11 are connected to one another by means of an intermediate section 15. In this case, the entire body 14 of the claw ring consists of a magnetically conductive material, from which the claws 10, 11 are exposed, for example milled out, cut or stamped, as radial sections 12, 13.

The power generation unit 6 further comprises an induction coil 17, which has an electrical conductor (not illustrated in the figure) that is arranged with a plurality of turns along the circumference of the bearing rings 2, 3. The electrical conductor is received in a matrix consisting of an electrically insulating material, in particular a varnish, with the result that a body in the form of an annular disk is formed. The body has a coil slot 18 on the outer circumferential surface.

The induction coil 17 is received in a receptacle 19 in the form of a circular ring and consists of an electrically insulating material such as plastic. For this purpose, the receptacle 19 has a U-shaped cross-section, and the induction coil 17 is introduced into the opening in the U-shaped cross-section of the receptacle 19.

The magnet ring 9 is fastened with an end face 20 on a limb face 21 close to the inner border of the receptacle 19. In particular, the magnet ring 9 is cohesively connected to the receptacle 19, with the result that a structural unit is produced, in which the magnetic pole pairs 7, 8 and the induction coil 18 are combined.

The arrangement of the magnetic pole pairs 7, 8 on the magnet ring 9 is selected respect to the claws 10, 11 of the claw ring 14 in such a way that the first magnetic pole, for example the north pole, of the first pole pair 7 is opposite the radial section 12 of the first claw 10 and the second magnetic pole of the second pole pair 8, which is adjacent in the circumferential direction, in this case a south pole, is arranged between the first claw 10 and the second claw 11 which is adjacent in the circumferential direction. The second claw 11 is opposite a pole with the same name as the north pole of the first pole pair 7, i.e. likewise a north pole, of the next but one claw (not illustrated in the figure) in the circumferential direction with respect to the first claw 10.

Figure 2:
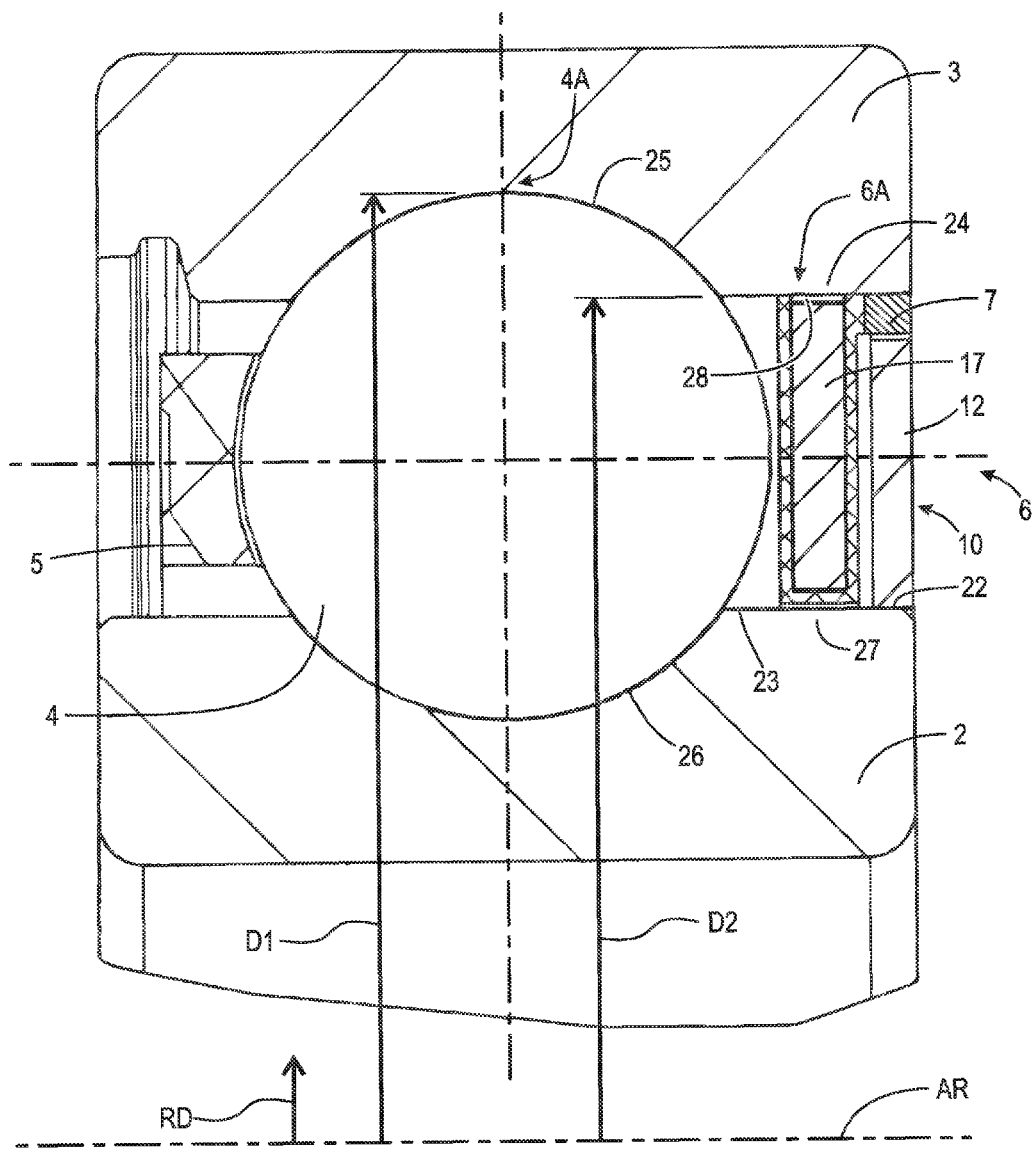
FIG. 2 shows the bearing shown in FIG. 1 in a cross-sectional view.

FIG. 2 shows a cross-sectional view of the bearing 1 in a fitted position, with the sectional plane being such that the first claw 10 and both magnetic poles of the first magnetic pole pair 7 can be seen. In this case, a north pole of the first pole pair 7 points towards the radial section 12 of the first claw 10, while maintaining an air gap and the south pole of the first pole pair 7 bears against the second bearing ring 3. The second claw 11 and the second magnetic pole pair 8 are located beneath the plane of the paper in the illustration in FIG. 2.

The claws 10, 11 of the claw ring and the entire body 14 of the claw ring are fastened with one edge 22 of the claw ring on an outer lateral surface 23 of the first bearing ring 2 by means of a press fit.

The receptacle 19 with the induction coil 17 and the first magnetic pole pair 7 are fixed on the second bearing ring 3 likewise by means of a press fit. In this case, the south pole of the first magnetic pole pair 7 bears directly against the magnetically conductive body of the second bearing ring 3, with the result that a magnetically conductive connection is formed between the first magnetic pole pair 7 and a magnetically conductive section 24 of the second bearing ring 3. This magnetically conductive section 24 extends from the south pole of the first magnetic pole pair 7 up to a first runway 25, on which the rolling body 4 with the body of the second bearing ring 3 forms a contact ellipse, in the region of which a further magnetically conductive connection of the second bearing ring 3 to the body of the rolling body 4 is formed.

The rolling body 4 runs away along a second runway 26 on the first bearing ring 2, with the result that a further contact, ellipse is formed between the body of the rolling body 4 and the body of the first bearing ring in the region of the second runway 26 and a further magnetically conductive connection is produced. A magnetically conductive section 27 of the first bearing ring 2 is formed between the second runway 26 and the section at which the edge 22 of the claw 10 bears against the body of the first bearing ring 2.

A magnetic circuit running peripherally around the induction coil 17 is then closed, starting from the south pole of the first pole pair 7 to the second pole with a different name, namely the north pole, of the same first pole pair 7 via the magnetically conductive section 26 on the body of the second bearing ring, the body of the rolling body 4, the magnetically conductive section 27 on the body of the first bearing ring 2 via the radial section 12 of the claw 10 to the north pole of the first pole pair 7. Correspondingly, a magnetic circuit running peripherally in the same sense around the induction coil 17 is formed in the case of the next but one pole pair (not illustrated in the figure) in relation to the first pole pair 7. In the event of the relative rotation of the two bearing rings 2, 3, the induction coil 17 is surrounded by a variable magnetic flux, which induces an AC voltage in the induction coil 17. This AC voltage can be used to detect the relative rotation, in particular the rotation speed, and to produce power.

The coil slot 18 makes it possible to form a cavity 28 with respect to the lateral surface of the second bearing ring 3 in the region of the magnetically conductive section 24. Substantially the entire interspace between the two bearing rings 2, 3 is available in the radial direction for the induction coil 17. In the axial direction, the induction coil 17 can be arranged using the space between the radial section 12 of the claw 10 and the rolling body 4. The cavity 28 can be filled with the plastic material of the receptacle 19, with the result that the induction coil 17 is arranged in such a way as to be surrounded on all sides by the plastic of the receptacle 19. It goes without saying that the bar magnet forming the first magnetic pole pair 7 can likewise protrude into the cavity 28.

The receptacle 19 for the induction coil 17 forms, with the radial section 12 of the claw, a thin gap, which can be provided as a sealing gap. This gap then becomes a further gap, which forms the receptacle with the lateral surface of the first bearing ring 2. It goes without saying in this case that a sealing lip of a seal can also be provided on the receptacle 19.

The claws 10, 11 and the body 14, in the form of a circular ring, of the claw ring terminate substantially flush with the end face of the first bearing ring 2. The claw ring 14 is fastened on the cylindrical lateral surface of the first bearing ring 2 without any structural changes to the lateral surface needing to be made so as to receive the claw ring 14. The structural unit with the magnet ring 9 and the induction coil 17 in the receptacle 19 likewise terminates flush with the end face of the second bearing ring 3 and is fixed on the cylindrical lateral surface of the second bearing ring 3. Over all, a power supply unit 6 is produced which is substantially neutral in terms of installation space and which makes it possible to form a high number of turns in the induction coil 17.

In the above-described exemplary embodiment, the magnetic south pole of the first pole pair 7 of the magnet ring 9 bears directly against a section of the lateral surface of the second bearing ring 3. Likewise, the claw 10 with the edge 22 bears directly against a section of the lateral surface of the first bearing ring 2. In both cases, interfaces form between the respective lateral surface and the magnetic pole of the pole pair 7, 8 and the claw 10, respectively. It goes without saying that a magnetically conductive contact element can also be provided which improves the magnetic conductivity in the region of the interface.

In the above-described exemplary embodiment, the claw 10 with the edge 22 bears against the lateral surface of the first bearing ring 2, with the result that a substantially linear connection to the body of the first bearing ring 2 is formed. It goes without saying that a substantially flat connection to the first bearing ring 2 can also be formed, for example by virtue of a section of the claw 10 resting on the end face of the first bearing ring 2 or by virtue of the claw having an axially set-back section, which bears flat against the lateral surface of the first bearing ring 2.

Furthermore, it goes without saying that the claw 10 can have an axially set-back guide section on the end section pointing towards the magnetic pole of the first pole pair 7 in order to improve the closing of the magnetic circuit to the magnetic pole.

In the above-described exemplary embodiment, an intermediate section 15 is arranged between adjacent claws 10, 11. A radial slit 30 can be provided in this intermediate section 15, said radial slit interrupting the body, in the form of a circular ring, of the claw ring. As an alternative or in addition to this, an aperture, in particular a through-bore, can be provided in the intermediate section 15, said aperture suppressing the occurrence of eddy currents between adjacent claws 10, 11.

Rolling body 4 includes point 4A at furthest distance D1, in radial direction RD orthogonal to axis of rotation AR for bearing 1, from axis of rotation AR. Power generation unit 6 includes end 6A at furthest distance D2, in radial direction RD, from axis AR. Distance D2 is less than distance D1.

In the above-described exemplary embodiment, the first claws 10, 11 of the claw ring 14 are connected by means of the intermediate region 15 to form the body 14, substantially in the form of a circular ring, of the first claw ring. It goes without saying that the intermediate region 15 can also be omitted, with the result that the first claw ring is formed from a peripherally running sequence of individual claws which are no longer connected to one another. The individual claws of the claw ring can likewise be connected by an intermediate region 15 to form a single claw ring, but the intermediate region 15 is formed from a magnetically nonconductive material, for example a plastic. In particular, the flat, radial sections 12, 13 of the claws 10, 11 can be introduced into guide slots in the plastic on the side edges and can be received in these guide slots in radially displaceable fashion in order to make it possible to form a fixed bearing arrangement against the magnetically conductive section 27 of the body of the first bearing ring 2.

LIST OF REFERENCE SYMBOLS

1 Bearing
2 First Bearing Ring
3 Second Bearing Ring
4 Rolling Body
5 Cage
6 Power Generation Unit
7 First Pole Pair
8 Second Pole Pair
9 Magnet Ring
10 First Claw
11 Second Claw
12 Radial Section of First Claw 10
13 Radial Section of Second Claw 11
14 Claw Ring
15 Intermediate Section
16 Section of Magnet Ring
17 Induction Coil
18 Coil Slot
19 Receptacle
20 End Face of Magnet Ring 9
21 Limb Face of Receptacle 19
22 Edge of Body 14 of Claw Ring
23 Lateral Surface of First Bearing Ring
24 Magnetically Conductive Section of Second Bearing Ring 3
25 First Runway
26 Second Runway
27 Magnetically Conductive Section of First Bearing Ring 2
28 Cavity

The invention claimed is:

1. A bearing, comprising:
an axis of rotation;
a first bearing ring having a body with a magnetically conductive section;
a second bearing ring having a body with a magnetically conductive section;
a rolling body:
arranged between the first bearing ring and the second bearing ring; and,
including a point at a first furthest distance, in a radial direction orthogonal to the axis of rotation, from the axis of rotation; and
a power generation unit which comprises:
an end at a second furthest distance, in the radial direction, from the axis of rotation;
a sequence of magnetic pole pairs, including a first magnetic pole pair having a first magnetic pole, the sequence of magnetic poles running peripherally along a circumference of the second bearing ring;
a claw ring fastened to the first bearing ring and having a sequence of claws, including a first claw, running peripherally along a circumference of the first bearing ring; and,
a magnetic induction coil, wherein:
the second furthest distance is less than the first furthest distance;
a closed magnetic circuit running peripherally around the induction coil is closed by the first magnetic pole of the first pole pair via the first claw of the claw ring;
the first claw of the claw ring is arranged in a magnetically conductive connection with the magnetically conductive section of the body of the first bearing ring;
the magnetic poles of the magnetic pole pairs are arranged in a magnetically conductive connection with the magnetically conductive section of the body of the second bearing ring; and,
the magnetic circuit is closed substantially via the magnetically conductive section of the first bearing ring, the magnetically conductive section of the second bearing ring, and the rolling body.

2. The bearing as claimed in claim 1, wherein the induction coil and the magnetic pole pairs are combined to form a common structural unit, which is fastened on the second bearing ring.

3. The bearing as claimed in claim 1, wherein the claw ring has a body formed as a circular ring that has a radial slit.

4. The bearing as claimed in claim 1, further comprising a magnetically conductive contact element.

5. The bearing as claimed in claim 4, wherein the magnetically conductive contact element comprises a liquid or pasty adhesive.

6. The bearing as claimed in claim 5, wherein the pasty adhesive is an adhesive containing iron or ferrite particles.

7. The bearing as claimed in claim 1, wherein:
the claw ring includes a second claw and a radially innermost portion formed as a circular ring;
the first and second claws are formed of magnetically conductive material and extend radially outward from the circular ring;
the circular ring includes magnetically non-conductive portion bordering the first and second claws.

8. A bearing, comprising:
an axis of rotation;
a first bearing ring having a body with a magnetically conductive section;
a second bearing ring located radially inward of the first bearing body having a body with a magnetically conductive section;
a rolling body arranged between the first bearing ring and the second bearing ring; and,
a power generation unit including:
a magnetic ring including:
a first side facing in a first axial direction parallel to the axis of rotation;
a second side facing in a second axial direction opposite the first axial direction;
first magnetic pole having a first polarity and extending from the first side to the second side at an outer circumference of the magnetic ring;

a second magnetic pole having a second polarity opposite the first polarity and extending from the first side to the second side at the outer circumference of the magnetic ring; and, a magnetically non-conductive portion located between the first and second magnetic poles in a circumferential direction, extending from the first side to the second side at the outer circumference of the magnetic ring, and bordering the first and second magnetic poles;

a claw ring fastened to the first bearing ring and having a sequence of claws, including a first claw, running peripherally along a circumference of the first bearing ring; and, a magnetic induction coil, wherein:

a line orthogonal to the axis of rotation passes through the first and second bearing rings, the claw ring, and the magnetic ring;

a closed magnetic circuit running peripherally around the induction coil is closed by the first magnetic pole of the first pole pair via the first claw of the claw ring;

the first claw of the claw ring is arranged in a magnetically conductive connection with the magnetically conductive section of the body of the first hearing ring;

the magnetic poles of the magnetic pole pairs are arranged in a magnetically conductive connection with the magnetically conductive section of the body of the second bearing ring; and, the magnetic circuit is closed substantially via the magnetically conductive section of the first bearing ring, the magnetically conductive section of the second bearing ring, and the rolling body.

9. A bearing, comprising:

an axis of rotation;

a first bearing ring having a body with a magnetically conductive section;

a second bearing ring located radially inward of the first bearing body having a body with a magnetically conductive section;

a rolling body arranged between the first bearing ring and the second bearing ring; and, a power generation unit including:

a magnetic ring directly fastened to the first bearing ring and including:

first magnetic pole having a first polarity;

a second magnetic pole having a second polarity opposite the first polarity; and, a magnetically non-conductive portion located between the first and second magnetic poles in a circumferential direction and bordering the first and second magnetic poles;

a claw ring fastened to the second bearing ring and including:

a radially inward ring portion; and, a plurality of claws extending radially outward from the ring portion, respective pairs of circumferentially adjacent claws separated by a respective gap in a circumferential direction; and, a magnetic induction coil, wherein:

a line parallel to the axis of rotation passes through the rolling element, the induction coil and the claw ring;

a closed magnetic circuit running peripherally around the induction coil is closed by the first magnetic pole of the first pole pair via the first claw of the claw ring;

the first claw of the claw ring is arranged in a magnetically conductive connection with the magnetically conductive section of the body of the first bearing ring; and, the magnetic poles of the magnetic pole pairs are arranged in a magnetically conductive connection with the magnetically conductive section of the body of the second bearing ring; and, the magnetic circuit is closed substantially via the magnetically conductive section of the first bearing ring, the magnetically conductive section of the second bearing ring, and the rolling body.

10. The bearing of claim 9, wherein:

a first claw in the plurality of claws has a first thickness parallel to the axis of rotation; and, the ring portion of the claw ring has a second thickness parallel to the axis of rotation substantially equal to the first thickness.

* * * * *